United States Patent
Thompson et al.

(10) Patent No.: US 10,197,167 B2
(45) Date of Patent: Feb. 5, 2019

(54) CERAMIC LINED VALVE

(71) Applicant: Morgan Technical Ceramics Australia Pty Ltd, Melbourne, Victoria (AU)

(72) Inventors: Stephen Thompson, Melbourne (AU); Gavin Thursfield, Melbourne (AU)

(73) Assignee: Morgan Technical Ceramics Australia Pty Ltd, Melbourne, Victoria (AU)

(*) Notice: Subject to any disclaimer, the term of this patent is extended or adjusted under 35 U.S.C. 154(b) by 0 days.

(21) Appl. No.: 15/506,667

(22) PCT Filed: Aug. 14, 2015

(86) PCT No.: PCT/EP2015/068802
§ 371 (c)(1),
(2) Date: Feb. 24, 2017

(87) PCT Pub. No.: WO2016/030219
PCT Pub. Date: Mar. 3, 2016

(65) Prior Publication Data
US 2017/0254422 A1    Sep. 7, 2017

(30) Foreign Application Priority Data

Aug. 28, 2014 (GB) .................................. 1415269.8

(51) Int. Cl.
*F16K 5/06* (2006.01)
*F16K 27/06* (2006.01)
*F16L 23/02* (2006.01)

(52) U.S. Cl.
CPC .......... *F16K 5/0657* (2013.01); *F16K 5/0663* (2013.01); *F16K 5/0678* (2013.01);
(Continued)

(58) Field of Classification Search
CPC ........ F16K 1/2057; F16K 1/2263; F16K 1/42; F16K 1/425; F16K 1/427; F16K 1/46;
(Continued)

(56) References Cited

U.S. PATENT DOCUMENTS 3,744,755 A * 7/1973 Gary, Jr. ............... F16K 5/0626
251/309
5,123,439 A * 6/1992 Powers ............... F16K 27/0272
137/15.24
(Continued)

FOREIGN PATENT DOCUMENTS

CN    202733031 U    2/2013
CN    203035993 U    7/2013
(Continued)

OTHER PUBLICATIONS

International Patent Application No. PCT/EP2015/068802, Search Report and Written Opinion, dated Oct. 19, 2015.

*Primary Examiner* — Reinaldo Sanchez-Medina
*Assistant Examiner* — Hailey K Do
(74) *Attorney, Agent, or Firm* — Kilpatrick Townsend & Stockton LLP; Dean W. Russell; Kristin M. Crall

(57) ABSTRACT

A ceramic lined valve comprising: •i) a valve body (20) having an end connection (50) for coupling the valve in fluidic communication with a fluid flow conduit; •v) a flow control member (22) within the valve body; characterized in that the ceramic lined valve further comprising: •vi) a lining (30) within the valve body comprising a single piece of ceramic, wherein the lining extends from the flow control. member to the end connection, the lining defining a valve seat abutting the flow control member, and •vii) a ceramic covering (40) forming a coupling face of the end connection, separate from and juxtaposed to the lining.

17 Claims, 4 Drawing Sheets

(52) U.S. Cl.
CPC .......... *F16K 5/0689* (2013.01); *F16K 27/067* (2013.01); *F16L 23/02* (2013.01)

(58) Field of Classification Search
CPC ...... F16K 1/465; F16K 5/0668; F16K 5/0673; F16K 5/0678; F16K 5/0689; F16K 5/0471; F16K 5/0271; F16K 25/005; F16K 27/06; F16K 27/062; F16K 27/065; F16K 27/067; F16K 27/0272; F16K 27/107; F16L 9/14; F16L 57/06; F16L 58/10; F16L 58/1009; F16L 58/1027; F16L 58/14; F16L 58/187
See application file for complete search history.

(56) References Cited

U.S. PATENT DOCUMENTS

| | | | |
|---|---|---|---|
| 5,127,430 A | | 7/1992 | Kutsko et al. |
| 5,353,832 A | * | 10/1994 | Berchem ............... F16K 5/0605 137/375 |

FOREIGN PATENT DOCUMENTS

| | | | | |
|---|---|---|---|---|
| CN | 203146890 U | | 8/2013 | |
| DE | 8700106 U1 | | 3/1987 | |
| DE | 102004063270 A1 | | 7/2006 | |
| DE | 102007015664 A1 | * | 10/2008 | ........... F16K 5/0657 |
| GB | 1215863 A | * | 12/1970 | .............. F16L 58/14 |
| WO | 2001040614 A2 | | 6/2001 | |

\* cited by examiner

CERAMIC LINED VALVE

CROSS REFERENCE TO RELATED APPLICATIONS

This patent application is the U.S. national stage of International Patent Application No. PCT/EP2015/068802, filed on Aug. 14, 2015, which application claims Priority to United Kingdom Patent Application No. 1415269.8, filed on Aug. 28, 2014, the entirety of each of which is incorporated herein by this reference.

FIELD OF THE INVENTION

This invention relates to a ceramic lined valve.

BACKGROUND

Valves are perhaps the most important component in any process industry as they are responsible for isolating or varying the flow of various process streams, and to control the rate of reactions in continuous processes. There are many valve designs that are only suitable for a specific duty; for example, butterfly valves and ball valves are primarily designed to isolate a flow but do not offer accurate flow control. A needle valve may be superior in controlling a high pressure fluid flow with great precision but it is designed to control throughput within a narrow operating range. There are other versatile valve designs that are equally capable of flow control and isolation, such as globe valves and diaphragm valves where the amount of valve opening can be designed to correspond linearly with the number of turns.

A valve, regardless of the design, generally consists of a few key components. It typically consists of a valve body containing a dynamic flow control member co-operating with a static valve seat; such flow control member is moved by a stem linked to a handle or actuator. To prevent leakage, seals, gaskets and packings may be used, both static and dynamic. These may be elastomer seals, for example made of PTFE or coated with PTFE for its high chemical resistivity. The valve body may be connected to upstream and downstream pipelines via a flow inlet and a flow outlet, each for example comprising a flange for compressing a gasket for sealing the connection.

In some processes, such as recovery of materials from coal ash, the process fluid comprises a high concentration of irregular coarse solid particles in suspension and/or is generally corrosive. Hence the process equipment and pipelines are required to be manufactured with a high degree of chemical and/or abrasion resistance. For example, a valve manufactured from mild steel will not be suitable for such applications since the surface in contact with the suspension flow may deteriorate rapidly; as such the whole valve will need regular replacing, leading to unscheduled process shut downs. The regions of seating contact between the flow control member and valve seat in particular are most susceptible to attrition damage since the suspension flow speeds up significantly though a narrowed valve opening; a worn out flow control member and or seat does not offer good sealing performance, and hence is incapable of isolating a flow.

Ceramic lined valves are well known, and are used in applications where fluid to be conveyed (whether liquid, powder, suspension or otherwise) is corrosive, abrasive, or both. Some examples may be found in WO0140614A2, U.S. Pat. No. 5,127,430A and U.S. Pat. No. 5,123,439A. Typical materials used in ceramic lined valves include dense ceramics such as alumina and zirconia, with partially stabilized zirconia providing good abrasion/corrosion resistance. Ceramic materials such as alumina and zirconia possess preferable mechanical properties such as excellent hardness and abrasion resistance, as well as being chemically inert and resistant to acidic or caustic materials. However the crystalline structure in ceramic materials is brittle and so a valve body made from a ceramic material or materials alone may fracture easily when it is subjected to shock or severe vibration. Therefore the common practice is to line a metal valve body with ceramic material so that the valve can be made to resist abrasion and corrosion by the process fluid, as well as having the ability to withstand shock and vibration.

Within the valve body, around the operative part of the valve (e.g. for a ball valve, the ball) turbulence can arise, which can lead to cavitation in liquid fluids, and scouring from particulate fluids. For this reason it is desirable to have as few junctions as possible in the ceramic lining, as junctions provide regions of weakness in the linings.

A further junction is where the valve is connected to adjacent pipework. The junction between a valve and the adjacent pipe is conventionally sealed by provision of a gasket between the pipe and the valve [for example of fluoropolymer, e.g. PTFE]. Fluoropolymers are good at resisting corrosive attack but are not so effective at resisting abrasive attack. Lining pipework with dense ceramics such as alumina or zirconia would be both expensive and technically difficult. For corrosive/abrasive fluids silicon carbide and sometimes alumina and zirconia pipe linings are generally used. Although such linings can be made relatively thin, for the most corrosive/abrasive materials relatively thick linings [e.g. 20 mm] are conventionally used. The silicon carbide used for such lining is porous in comparison with alumina or zirconia ceramics, and has less mechanical strength. In addition it is difficult to ensure that the silicon carbide lining is aligned with the end flange of the pipework. This means that if the silicon carbide lining is short of the end flange of the pipework, a gap is present that has to be filled by the gasket between valve and pipework. If the silicon carbide lining is proud of the end flange of the pipework, then it can be damaged when the valve is tightened up to the pipework. In either case, this exposes the gasket material to attack and can in the extreme result in the corrosive/abrasive fluids reaching the metal body of the valve.

DE 102004063270A1 (Cera System Verschliessschutz GmbH) discloses a ceramic lined ball valve that comprises a ceramic ball in cooporation with a ceramic valve seat. However there is no mention of ceramic material protecting the valve inlet/outlet connections. Thus only the vulnerability at the valve opening is addressed, and not at the connection to the upstream and downstream pipework. There are commercial examples manufactured by this manufacturer that comprise linings extending from the valve seat to the flanges for additional protection, however the valve may still be damaged from any corrosive material that seeps through the joints and comes into contact with the metal valve body, for example the at the connection to the valve end flanges. In some examples a PTFE insert is sandwiched between the metal valve body and the ceramic lining to offer additional protection against corrosion, in case a leak in the ceramic lining.

CN203146890U discloses a ball valve with ceramic linings having ceramic end connections that are recessed into metallic pipe connection flanges, in order to protect the metallic flanges e.g. in case of failure or erosion of a flange sealing gasket or the adjacent pipe flange and/or lining. The valve seats are supported on springs so as provide pressure to the valve seat to seal against the valve ball. Additionally the springs allow the components to accommodate thermal expansion in order to remain mobile even at high temperatures. Such design inevitably introduces crevices along the flow path where cavitation may occur or particles may accumulate. Accumulated particles in this crevice may prevent the movement of the seat thereby requiring higher torque to move the valve ball and potentially "jamming" the valve. Furthermore, although the joints between the valve seats and adjacent ceramic lining components are protected by seals, these seals may wear and fail due to movement of the valve seat, allowing corrosive fluids to seep though and corrode the metal valve body. Furthermore stress may concentrate at a right angled area joining the ceramic end connections and the remainder of the lining, making the valve susceptible to damage under shock and vibration.

As a result, a ceramic lined valve that is robust, of simple construction and which provides enhanced protection against corrosion and abrasion is desirable.

SUMMARY

The present applicant has mitigated the above problems by providing a ceramic lined valve comprising:
 i) a valve body having an end connection for coupling the valve in fluidic communication with a fluid flow conduit;
 ii) a flow control member within the valve body;
 iii) a lining within the valve body comprising a single piece of ceramic, wherein the lining extends from the flow control member to the end connection, the lining defining a valve seat abutting the flow control member, and
 iv) a ceramic covering forming a coupling face of the end connection, separate from and juxtaposed to the lining.

The ceramic lining provides a flow passage for corrosive and abrasive fluids. Since the lining is manufactured from a single piece of ceramic, there are no crevices or vulnerable seals (e.g. abrasion prone elastomer or fluoropolymer seals) that come in direct contact with the working fluid, thus improving the longevity and reliability of the valve.

Optionally, the end connection comprises a flange. As such the ceramic lined valve can be fitted directly into standard flanged pipelines. The ceramic coupling face is manufactured separately from the ceramic lining to relieve the stress that arises when the coupling face covering and the lining are manufactured as a single piece of ceramic, as previously.

Optionally, the ceramic lined valve further comprises a ceramic enclosure containing a ceramic shaft for moving the flow control member between an open position and a closed position. The use of ceramic shaft is preferred, since the shaft may come in contact with the corrosive fluid, particularly when the flow control member (e.g. the ball or gate in the case of a ball or gate valve) is of a "floating" design.

Optionally, a protective coating is interposed between the valve body and the ceramic lining, and/or between the valve body and the ceramic covering. The valve body is typically manufactured from metal such as mild steel or stainless steel for their mechanical strength and reasonable cost. The protective coating can serve one or more of several functions: it may act as a backup to the ceramic lining and/or covering to protect the valve body particularly against chemical attack; it may act as a cement or adhesive layer to secure the ceramic lining and/or covering to the valve body; and/or it may act as a stress relief layer, not only absorbing shock and vibration e.g. arising from fluid pressure and turbulence, but also allowing thermally induced movement between the valve body and the ceramic lining, thereby relieving or eliminating stress that would otherwise arise through differential thermal expansion. Applying the protective layer as a coating of relatively small thickness reduces the size of the valve body required. The thickness of the coating may still be sufficient to absorb shock, vibration and thermal movement effectively. Optionally, the protective coating is fluoropolymer, but it can be any protective coating known to the person skilled in the art, for example a powder coating or galvanized surface.

Optionally, the ceramic covering lies substantially flush with an end face of the end connection. The end connection thus may be coupled directly to (for example) a standard flanged connection of adjacent pipework. Optionally, the ceramic covering is substantially washer-shaped; as such it may be fully covered by a conventional gasket. Optionally, the ceramic lining is tubular and extends through an aperture in the ceramic covering to provide a seamless reinforced flow passage for the corrosive and abrasive fluids. Optionally, a resilient seal is interposed between the ceramic lining and the ceramic covering, in order to prevent the fluid from seeping through the junction and corroding the metallic valve body.

Optionally, the ceramic lining comprises a valve seat at its inner end and optionally, the inner end of the ceramic lining comprises a radially enlarged rim, e.g. in order to accommodate and support the flow control member. Optionally, the radially enlarged rim is sealed to a further ceramic liner in the valve body by a resilient seal in order to protect the valve body from corrosion caused by the fluid.

Optionally, the flow control member comprises a ceramic ball comprising an aperture. The aperture may be aligned with the direction of the flow in an open position of the flow control member to provide flow passage. The aperture may be moved e.g. progressively until it is perpendicular to the direction of the flow in the closed position for limiting and/or stopping the flow. However the ceramic flow control member may be any other mechanisms known to the person skilled in the art, for example plates, cylinders, poppets or pistons/shuttles.

Optionally, an upstream fluid pressure biases the flow control member against a valve seat to form a seal in the closed position. In this case the ceramic ball may be loosely fitted onto the valve stem or otherwise allowed to "float" relative to the valve body and seating surfaces. This float is primarily designed to relieve any adhesion caused by slurry deposits and thereby reduce the actuation torque of the valve ball. Additionally the float will prevent seizure under thermal expansion. The sealing pressure against the valve seat increases with the upstream fluid pressure which increases to a maximum as the valve moves into the closed position.

Optionally, the ceramic lined valve further comprises resilient seals to prevent leakage. The seals are preferably provided in the joints between different components e.g. of the ceramic lining. They may be essentially static, only having to take up stress and/or thermally induced movement of the components between which they effect a seal. The seals preferably comprise PTFE or PTFE coatings but they can be made of any material or combination of materials known to the person skilled in the art, for example nitrile rubber or other fluoropolymers. They may be recessed within or between components of the ceramic lining, so as to be protected from abrasion/erosion by the process fluid.

BRIEF DESCRIPTION OF THE DRAWINGS

Further features and aspects of the present invention will be apparent from the following detailed description of illustrative embodiments made with reference to the drawings, in which.

DETAILED DESCRIPTION

Figure 1:
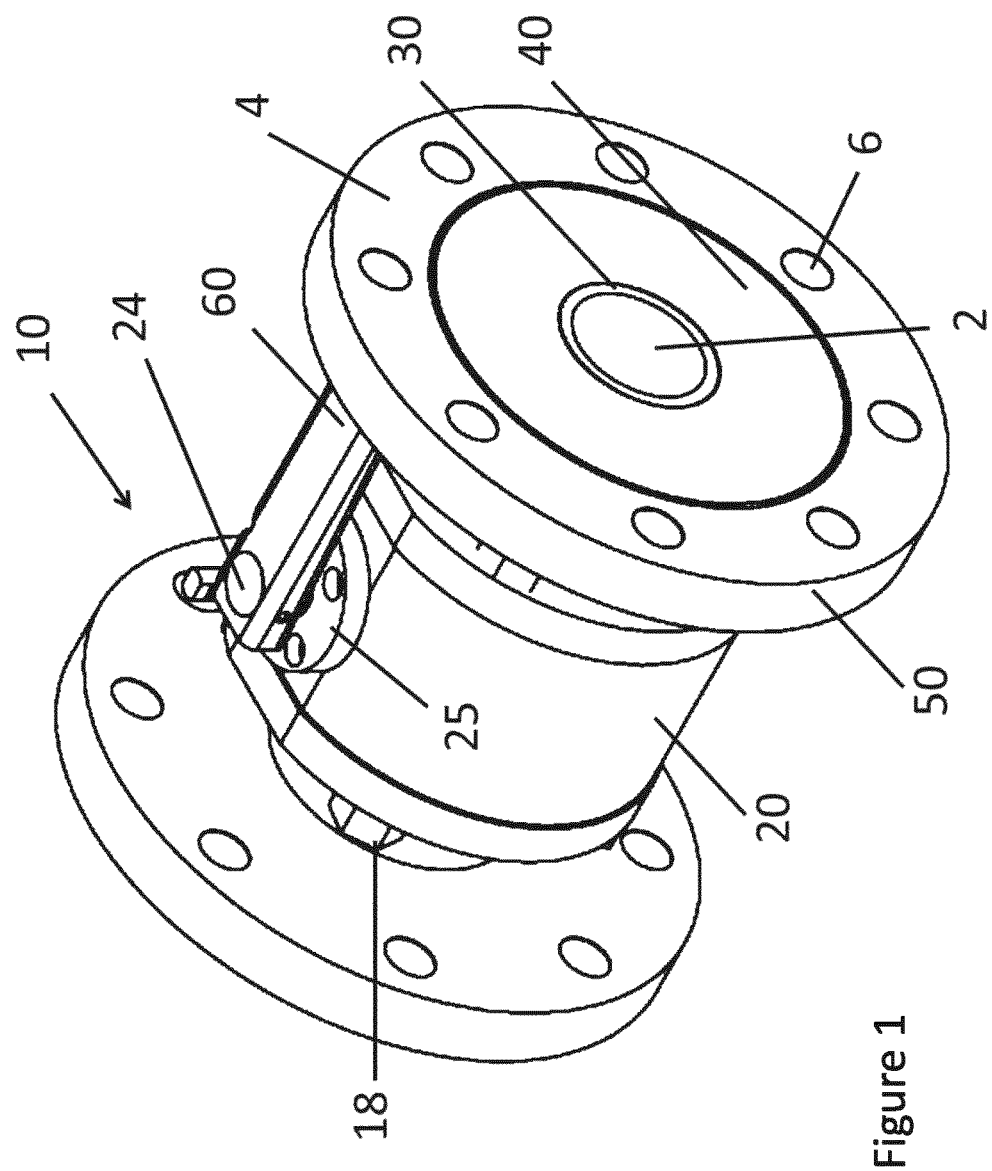
FIG. 1 is a perspective view showing the ceramic lined valve according to an embodiment of the present invention.
Figure 2:
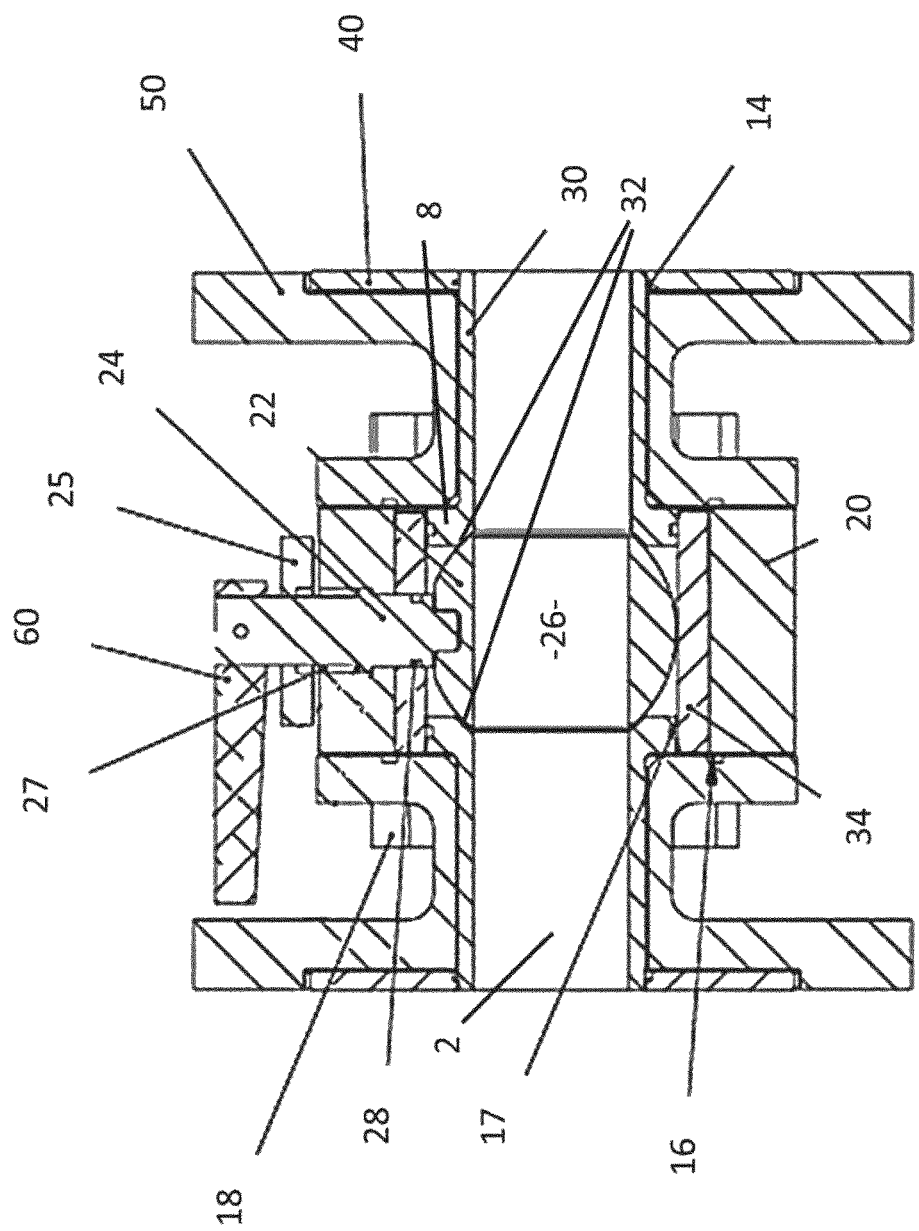
FIG. 2 is a schematic cross section view showing the construction of the ceramic lined valve of FIG. 1.
Figure 3B:
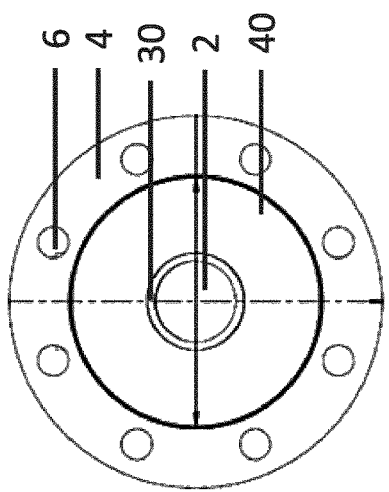
FIG. 3a, FIG. 3b and FIG. 3c are respective diagrammatic side, front and top views of the ceramic lined valve of the preceding Figures.
Figure 3C:
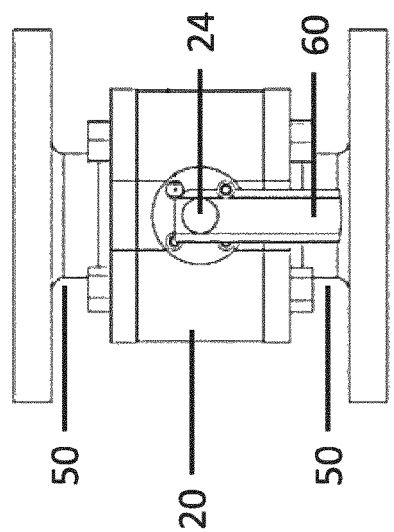
Figure 3A:
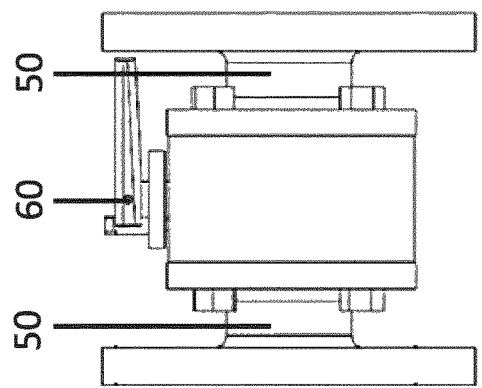

FIG. 1 to FIG. 3 illustrate a valve 10 according to an embodiment of the present invention. As shown in FIG. 1 and FIG. 2, the valve 10 comprises a valve body 20 and end flanges 50 fabricated from non-ceramic materials, preferably metal such as mild steel or stainless steel for their mechanical strength. The valve body 20 and end flanges 50 are assembled together using a plurality of stud sets 18. Each end flange 50 further comprises a washer-shaped ceramic covering 40. This forms an annular coupling face which surrounds a central flow passage 2 extending axially through the flange. The coupling face is itself surrounded by an exposed rim 4 of the end flange 50 containing the usual circumferentially spaced stud holes 6 by which the flange 50 is secured to an adjacent corresponding pipe flange (not shown). By stopping radially short of the securing stud holes 6, the ceramic covering may be kept to a simple washer shape.

Each end flange 50 is provided with a tubular, generally cylindrical ceramic lining 30 for protection of the metallic parts. The joint between the lining 30 and covering 40 is sealed with an annular PTFE seal 14. Such arrangement helps to prevent any corrosive liquid from seeping into the contact region between the ceramic lining 30, covering 40 and the non-ceramic end flanges 50. A part of the end flanges 50 is recessed to accommodate the covering 40, so that once the valve is fully assembled, an exposed end of the ceramic lining 30 and the coupling face of the ceramic cover 40 lie generally flush with the exposed rim of the end flange 50. The coupling face and liner end may be slightly recessed within the exposed rim 4, so that a sealing gasket applied to the ceramic covering 40 is centrally located and not excessively crushed when the flange studs are fully tightened. Alternatively, the coupling face may stand slightly proud of the exposed rim 4, so that the rim and an adjacent pipe flange do not interfere with each other as fastening nuts on the flange studs are evenly torqued so as to evenly energize the flange sealing gasket. Separate construction of the ceramic lining 30 and the ceramic covering 40 relieves the stress that would otherwise exist in a one piece design as featured in the prior art. The outer end of the lining 30 preferably passes through a central aperture in the washer-shaped covering 40. The annular seal 14 is accommodated within this aperture. Therefore axial compression of the covering 40 as the flange joint is tightened, is taken up by slight relative axial movement between the covering 40 and lining end at the seal 14. Similar movement can take place as a result of differential thermal expansion between the metallic part of the flange 50 and the ceramic lining 30. In either case, no bending stress (and hence tensile stress in the outer part of the bend) can arise at the joint between the lining 30 and the covering 40. In a less preferred arrangement, the outer end of the lining 30 stops short of, and lies next to, the inner flat face of the covering 40, adjacent to the central aperture. The diameter of the central aperture of the covering 40 is thus decreased to match the inner diameter of the tubular lining 40 and the end of the tubular lining is juxtaposed to the covering 40, with a small clearance, rather than passing through the central aperture. A seal such as 14 is again accommodated between the covering 40 and lining 30, but is compressed and expands under relative movement between these components as allowed for by the clearance, rather than taking up relative sliding movement.

An actuator 60 is provided for adjusting the degree of valve opening and controlling the amount of fluid flow, such as the manually actuated lever 60 shown in FIG. 1. However the actuator can be any device known to the person skilled in the art, for example pneumatic, hydraulic and electric actuators. As shown in FIG. 2, the actuator 60 is in connection with a flow control member 22 via a ceramic stem 24, for moving the flow control member 22 between an open position and a closed position (or to any intermediate position). In this particular example, the valve 10 is a ball valve and the flow control member 22 is a ceramic ball with a diametric aperture 26. However other valve types are also applicable, for example butterfly valves or gate valves. The valve body 20 further comprises a ceramic body lining 34 for shielding its metallic surface from the fluid flowing through the flow passage. The inner end of each ceramic lining 30 has a radially outwardly enlarged rim 8, sealed to an inner bore of the ceramic body lining 34 by an annular seal 17. Seals 14, 16 and 17 may comprise PTFE or a PTFE coating or any other suitable material or materials. The ceramic stem 24 is locked in place through the valve body 20 and ceramic body lining 34 by a bonnet 25 and is sealed by a stem packing 27 and an O-ring 28.

When the valve is put into the open position, the valve aperture 26 is aligned with the flow passage 2; whereas in the closed position the aperture 26 is positioned perpendicularly to the flow passage for stopping the flow. The inner corner of the enlarged rim 8, at its junction with the flow passage 2, is formed as a part-spherical recess 32, which co-operates with the flow control member (ball) 22 to form a valve seat. To prevent valve seizure due to thermal expansion or particle entrapment, the flow control member 22 "floats" relative to the ceramic linings 30 at the valve seats 32. To that end, it is free to move slightly in radial and axial directions relative to the valve stem 24. When the flow control member 22 is put in the closed position it is sealed against the relevant one of the two valve seats 32 by the upstream pressure.

The ceramic lining 30 with its inner end flange 8 and valve seat 32 is constructed from a single piece of ceramic lying along and surrounding the flow passage 2. Such a design eliminates crevices and wear prone/perishable seals. It also helps to prevent the buildup of particulate residues or sludge by eliminating crevices/recesses in which such solid materials can become trapped. The flow passage thus formed also presents a relatively smooth inner surface which reduces turbulence and offers enhanced protection against cavitation erosion. None of the seals 14, 16 and 17 are directly exposed to fluid flow, but are instead shielded from fast flowing fluid by adjacent ceramic components, thus minimizing damage due to abrasion/erosion. In fact, since the seals 14, 16 and 17 do not come in contact with any moving parts (apart from very slight movement arising from thermal cycling and stress/strain behaviour) they do not require frequent replacement, extending the valve service interval.

To provide further protection, the interior surfaces of the metallic valve body 20 and end flanges 50, i.e. the surfaces of these components in contact with the ceramic liner 30, ceramic coverings 40 and ceramic body lining 34, are coated with PTFE or a similar chemically resistant/chemically inert coating prior to assembly. Additionally or alternatively, the coating may be applied to the ceramic components prior to their insertion into the valve body and end flanges 50. Such a coating forms a physical barrier to protect the metallic surface from any leaked corrosive fluid and improves the reliability of the valve. The PTFE or other coating material may also act as an locating or retaining layer for securing the ceramic components into the metallic valve body 20 and end flange 50. In some cases if the PTFE or other coating is sufficiently thick it may also act as a shock absorber to dampen vibrations, prolonging the longevity of the valve. Such coatings and the processes for their application and for the installation and adhesive retention of the ceramic components form an independent aspect of the present invention.

Figure 4:
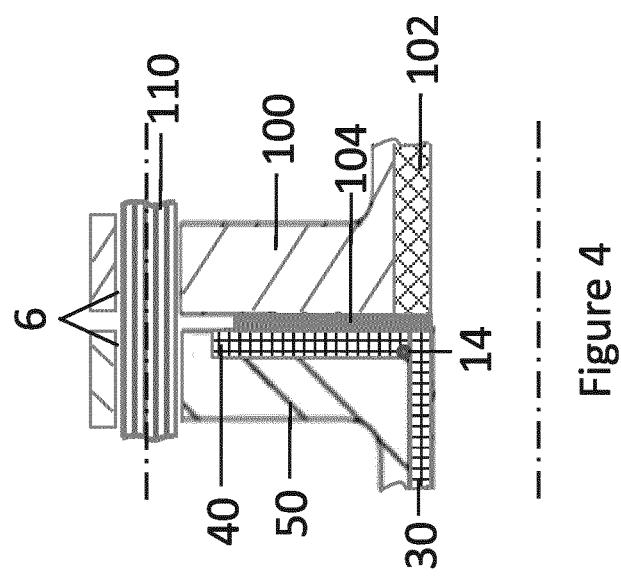
FIG. 4 is a scrap cross-sectional view of a valve flange formed according to an embodiment of the invention, coupled to an adjacent pipe flange.

As shown in FIG. 4, the valve flanges 50 are each typically bolted to an adjacent pipe flange 100 by studs 110 received in the holes 6. A chemically resistant gasket 104, e.g. comprising PTFE and/or other fluoropolymers, is compressed between the mating face of the covering 40 and an adjacent mating face of the pipe flange 100. The silicon carbide or similar lining 102 of the pipe is usually thicker than the (typically alumina or zirconia) valve flange component lining 30 and covering 40. The end of the pipe lining 102 may finish short of the pipe flange mating face, or may stand proud of the pipe flange mating face. In the latter case, it is vulnerable to overstressing and cracking as the flange joint is made up. In either case, the radially inner part of the gasket 104 adjacent to the lining 102 may not be properly energized and/or leakage paths may exist, potentially exposing the metallic pipe flange 100 and gasket to the process fluid and to chemical attack. This may cause the de-energized portion of the gasket 104 to grow radially larger. However, as long as a complete circumferential portion of the gasket 104 remains energized, the flange seal remains intact. Because the gasket 104 is supported across its entire diameter by the covering 40 and because the valve flange metal is protected by the covering 40, lining 30, annular seal 14 and by the corrosion resistant coating, this metal is never exposed to the corrosive and/or erosive effects of the process fluid. Therefore the valve flange assembly remains in good condition even if the pipe flange becomes corroded to the point where leakage occurs and replacement of the pipe becomes necessary.

Further variations and modifications to the invention will be apparent to the person skilled in the art, while remaining within the scope of the claims.

The invention claimed is:

1. A ceramic lined valve comprising:
   i) a valve body having an end connection for coupling the valve in fluidic communication with a fluid flow conduit;
   ii) a flow control member within the valve body;
   iii) a lining within the valve body comprising a single piece of ceramic, wherein the lining extends from the flow control member to the end connection, the lining defining a valve seat abutting the flow control member, and
   iv) a ceramic covering forming a coupling face of the end connection, separate from and juxtaposed to the lining, wherein an outer end of the lining passes through a central aperture in the ceramic covering, and wherein a resilient seal is interposed between the ceramic lining and the ceramic covering.

2. The ceramic lined valve of claim 1, further comprising a ceramic enclosure containing a ceramic shaft for moving the flow control member between an open position and a closed position.

3. The ceramic lined valve of claim 1, wherein the ceramic covering lies substantially flush with an end face of the end connection.

4. The ceramic lined valve of claim 1, wherein the ceramic covering is substantially washer-shaped.

5. The ceramic lined valve of claim 1, wherein the ceramic lining is tubular and extends through an aperture in the ceramic covering.

6. The ceramic lined valve of claim 1, wherein the ceramic lining comprises a valve seat at its inner end.

7. The ceramic lined valve of claim 1, wherein the end connection comprises a flange.

8. The ceramic lined valve of claim 1, wherein the flow control member comprises a ceramic ball comprising an aperture; and wherein the aperture may be aligned with the direction of the flow in an open position of the flow control member to provide flow passage; and wherein the aperture may be moved perpendicular to the direction of the flow in the closed position for limiting and/or stopping the flow.

9. The ceramic lined valve of claim 1, wherein an upstream fluid pressure biases the flow control member against a valve seat to form a seal in a closed position.

10. The ceramic lined valve of claim 1, in which a protective coating is interposed between the valve body and the ceramic lining, and/or between the valve body and the ceramic covering.

11. The ceramic lined valve of claim 10, wherein the protective coating comprises a fluoropolymer such as polytetrafluoroethylene ("PTFE").

12. A method for making the ceramic lined valve of claim 10, wherein the protective coating is applied prior to insertion of the ceramic lining.

13. The ceramic lined valve of claim 10, wherein the protective coating adhesively secures the ceramic lining to the valve body.

14. The ceramic lined valve of claim 1, wherein the inner end of the ceramic lining comprises a radially enlarged rim.

15. The ceramic lined valve of claim 14, wherein the radially enlarged rim is sealed to a further ceramic liner in the valve body by a resilient seal.

16. The ceramic lined valve of claim 1, comprising a resilient seal for preventing leakage.

17. The ceramic lined valve of claim 16, wherein the resilient seal is provided in a joint between different components of the ceramic lining.

* * * * *